(12) United States Patent
Meirav et al.

(10) Patent No.: US 11,071,939 B2
(45) Date of Patent: Jul. 27, 2021

(54) CARTRIDGE FOR AIRFLOW SCRUBBING SYSTEMS AND METHODS OF MANUFACTURE THEREOF

(71) Applicant: enVerid Systems, Inc., Westwood, MA (US)

(72) Inventors: Udi Meirav, Newton, MA (US); Sharon Perl-Olshvang, Pardes Hanna-Karkur (IL)

(73) Assignee: enVerid Systems, Inc., Westwood, MA (US)

( * ) Notice: Subject to any disclaimer, the term of this patent is extended or adjusted under 35 U.S.C. 154(b) by 238 days.

(21) Appl. No.: 16/324,039

(22) PCT Filed: Aug. 9, 2017

(86) PCT No.: PCT/US2017/046136
§ 371 (c)(1),
(2) Date: Feb. 7, 2019

(87) PCT Pub. No.: WO2018/031679
PCT Pub. Date: Feb. 15, 2018

(65) Prior Publication Data
US 2019/0209962 A1    Jul. 11, 2019

Related U.S. Application Data

(60) Provisional application No. 62/505,919, filed on May 14, 2017, provisional application No. 62/373,370, (Continued)

(51) Int. Cl.
*B01D 53/04* (2006.01)
*B01D 24/00* (2006.01)
(Continued)

(52) U.S. Cl.
CPC ....... *B01D 53/0415* (2013.01); *B01D 24/001* (2013.01); *B01D 24/04* (2013.01);
(Continued)

(58) Field of Classification Search
CPC ............... B01D 53/0415; B01D 35/30; B01D 33/0093; B01D 27/00; B01D 27/08; B01D 24/001; B01D 24/10; B01D 24/04
(Continued)

(56) References Cited

U.S. PATENT DOCUMENTS 3,453,957 A    7/1969   Hamilton
3,630,007 A *  12/1971  Neumann .............. B01D 46/30
                                                96/129
(Continued)

FOREIGN PATENT DOCUMENTS

WO    WO 2005/058589 A1    6/2005
WO    WO 2010/027868 A2    3/2010
(Continued)

OTHER PUBLICATIONS

Extended European Search Report issued in European Patent Application No. 17840222.8, filed by Enverid Systems Inc., dated Jan. 31, 2020; 8 pages.
(Continued)

*Primary Examiner* — Robert A Hopkins
(74) *Attorney, Agent, or Firm* — Cooley LLP

(57) ABSTRACT

A sorbent cartridge retention frame configured for use in an air scrubbing system comprising a first inlet side, a second outlet side, a plurality of compartments each configured to hold a solid-sorbent material, a plurality of respective walls arranged to form and separate the plurality of compartments, a first permeable membrane arranged to cover the first inlet side, a second permeable membrane arranged to cover the second outlet side. The first and/or second permeable mem-
(Continued)

brane are configured for affixation to respective ends of the walls through a process of melting and solidification of the wall material such that wall material bonds with the membrane material.

13 Claims, 10 Drawing Sheets

Related U.S. Application Data filed on Aug. 11, 2016, provisional application No. 62/372,380, filed on Aug. 9, 2016, provisional application No. 62/372,352, filed on Aug. 9, 2016.

(51) Int. Cl.
*F24F 3/00* (2006.01)
*B01D 24/10* (2006.01)
*B01D 24/04* (2006.01)

(52) U.S. Cl.
CPC ............ *B01D 24/10* (2013.01); *F24F 3/00* (2013.01); *B01D 2257/502* (2013.01); *B01D 2257/504* (2013.01); *B01D 2257/708* (2013.01); *B01D 2257/91* (2013.01); *B01D 2258/06* (2013.01); *B01D 2259/4508* (2013.01)

(58) Field of Classification Search
USPC ..................................... 96/134; 55/516, 518
See application file for complete search history.

(56) References Cited

U.S. PATENT DOCUMENTS

| | | |
|---|---|---|
| 3,865,924 A | 2/1975 | Gidaspow et al. |
| 4,292,059 A | 9/1981 | Kovach |
| 4,917,862 A | 4/1990 | Kraw et al. |
| 5,942,060 A | 8/1999 | Berger |
| 6,521,026 B1 | 2/2003 | Goto |
| 7,291,382 B2 | 11/2007 | Krueger et al. |
| 7,407,533 B2 | 8/2008 | Steins |
| 7,938,926 B2 | 5/2011 | Hughes et al. |
| 8,157,892 B2 | 4/2012 | Meirav |
| 8,690,999 B2 | 4/2014 | Meirav et al. |
| 10,143,959 B2 | 12/2018 | Meirav et al. |
| 2009/0294366 A1 | 12/2009 | Wright et al. |
| 2011/0206572 A1 | 8/2011 | McKenna et al. |
| 2012/0073443 A1 | 3/2012 | Hurley et al. |
| 2012/0216676 A1 | 8/2012 | Addiego et al. |
| 2012/0222500 A1 | 9/2012 | Riess et al. |

FOREIGN PATENT DOCUMENTS

| | | |
|---|---|---|
| WO | WO 2012/158911 A2 | 11/2012 |
| WO | WO 2015/123454 A1 | 8/2015 |

OTHER PUBLICATIONS

International Search Report and Written Opinion issued in International Patent Application No. PCT/US2017/46136, by Enverid Systems, Inc.; dated Oct. 19, 2017, 12 pages.

Chinese Patent Application No. 201780060899.8 by Enverid Systems, Inc.: First Office Action, dated Mar. 22, 2021, with partial English translation, 11 pages.

Decision to Grant European Patent Application No. 17840222.8, dated Mar. 18, 2021, 2 pages.

* cited by examiner

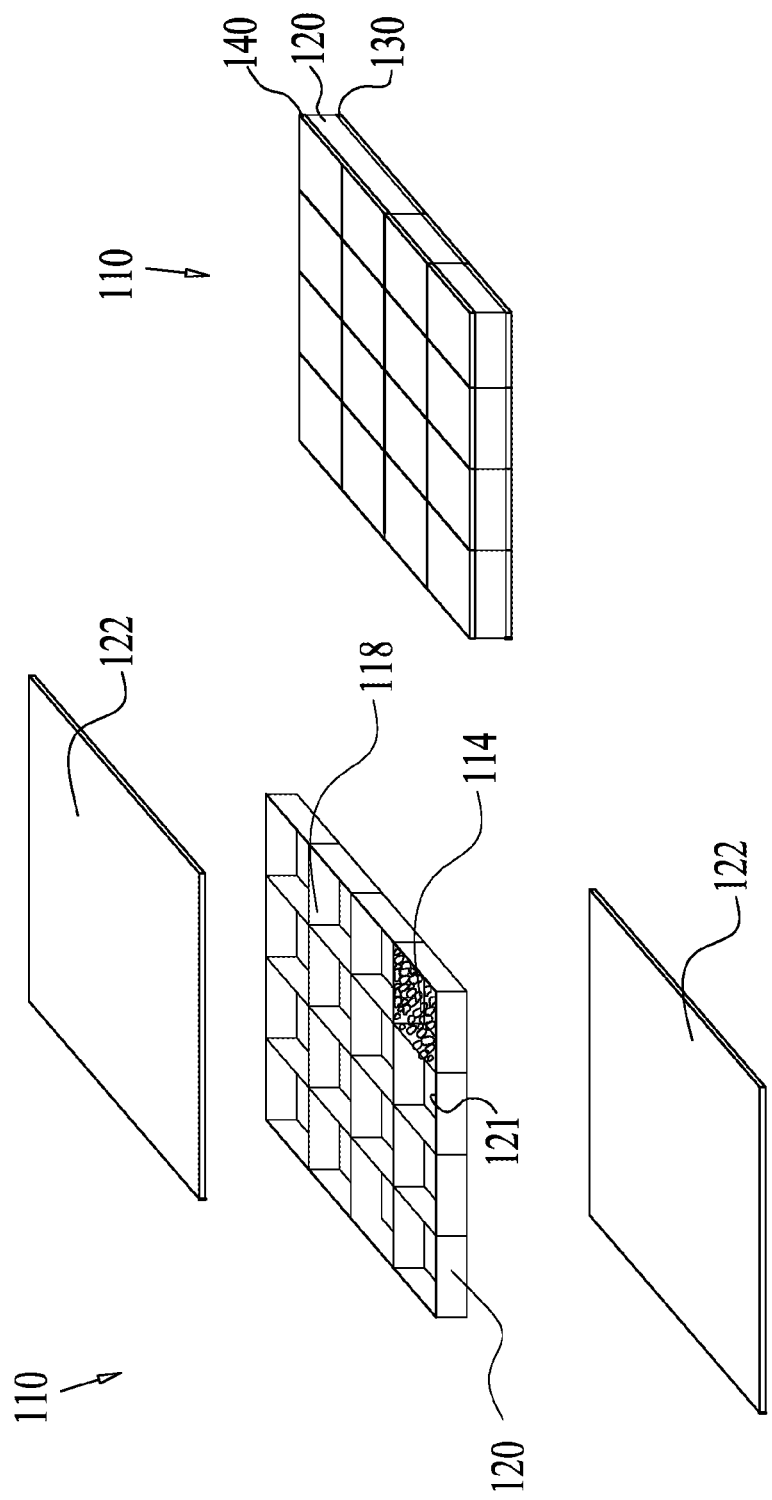

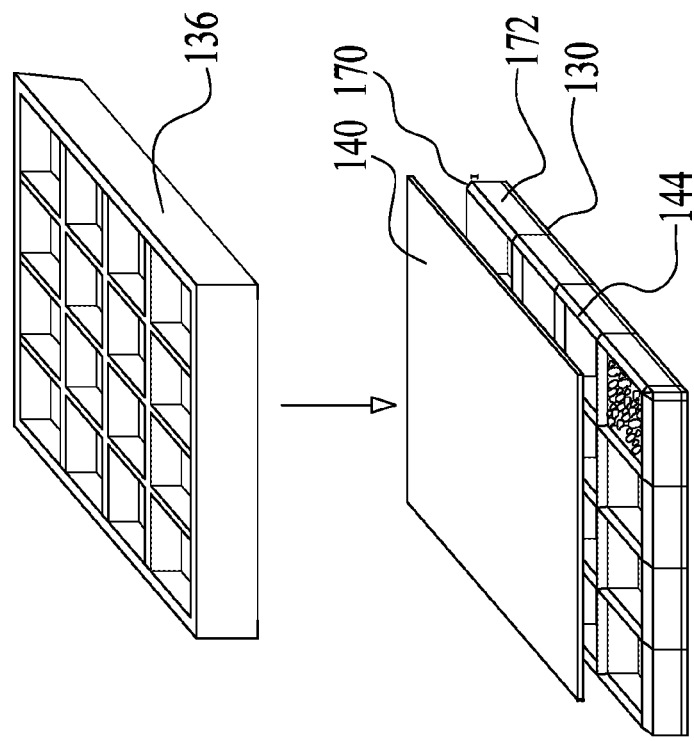
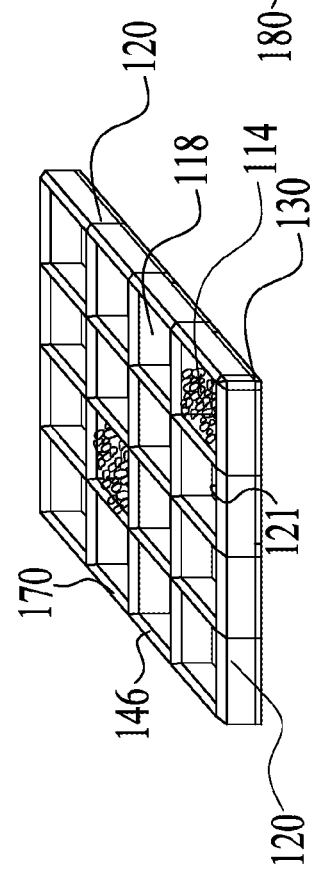
FIG. 6D
FIG. 6C

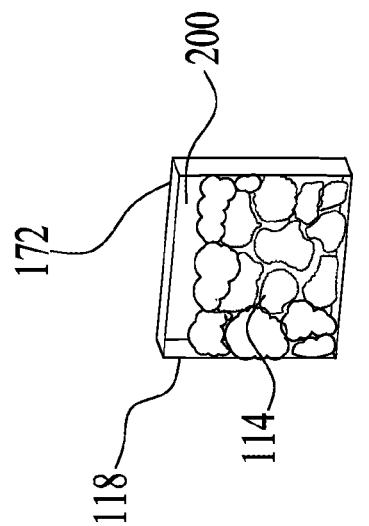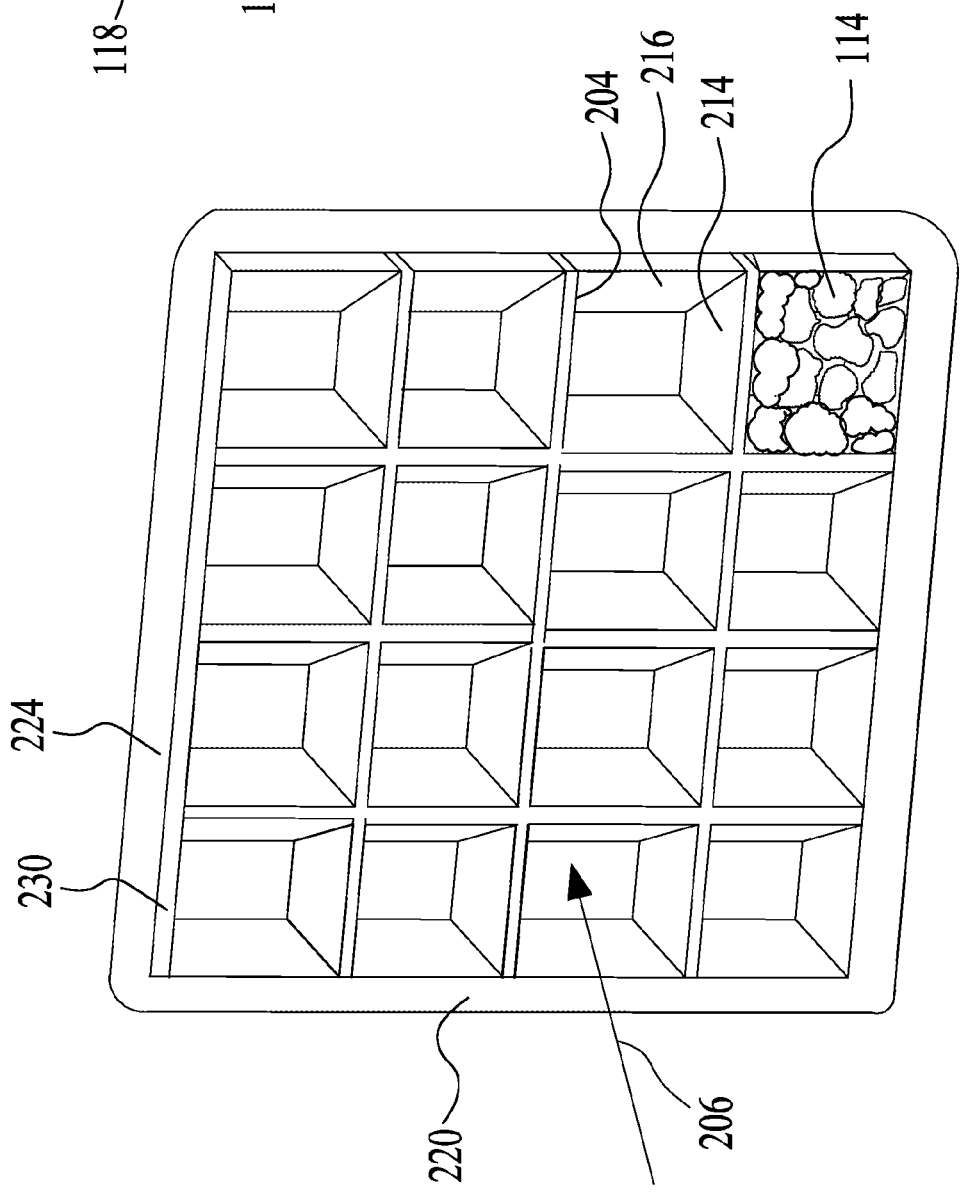

CARTRIDGE FOR AIRFLOW SCRUBBING SYSTEMS AND METHODS OF MANUFACTURE THEREOF

CROSS REFERENCE TO RELATED APPLICATIONS

This application is a National Stage Entry entitled to and hereby claiming priority under 35 U.S.C. §§ 365 and 371 to corresponding PCT Application No. PCT/US2017/046136, filed Aug. 9, 2017, entitled "Cartridge for Airflow Scrubbing Systems and Methods of Manufacture Thereof", which in turn claims priority to U.S. Provisional Patent Application No. 62/372,352 filed Aug. 9, 2016, entitled "Cartridge for an Airflow Scrubbing System"; U.S. Provisional Patent Application No. 62/372,370 filed Aug. 9, 2016, entitled "Welding a Cartridge for an Airflow Scrubbing System"; U.S. Provisional Patent Application No. 62/372,380 filed Aug. 9, 2016, entitled "Vertical Cartridges in Airflow Systems"; and U.S. Provisional Patent Application No. 62/505,919 filed May 14, 2017, entitled "Cartridge Surface Feature"; each one of which is incorporated by reference herein in its entirety.

FIELD OF THE DISCLOSURE

The present application generally relates to enclosure assemblies in airflow systems, and in particular to regenerable sorbent cartridges in air scrubbing systems.

BACKGROUND

Indoor air within buildings and other closed spaces can be affected by a plurality of substances comprising contaminants. In order to maintain good air quality, the circulating air should be refreshed, either by continually replacing it with fresh air, or by removing the unwanted contaminants, or both.

SUMMARY OF SOME OF THE EMBODIMENTS

In some embodiments of the present disclosure, a cartridge which includes a sorbent retention frame is provided, which is configured for use in an air scrubbing system. comprising a first inlet side, a second outlet side, a plurality of compartments each configured to hold a solid-sorbent material, a plurality of respective walls arranged to form and separate the plurality of compartments, a first permeable membrane arranged to cover the first inlet side, a second permeable membrane arranged to cover the second outlet side. The first and/or second permeable membrane are configured for affixation to respective ends of the walls through a process of melting and solidification of the wall material such that wall material bonds with the membrane material. Bond may be defined as the joining together of the two materials through at least heat and/or pressure.

In some embodiments, at least one of the ends of the walls is beveled, sloped, and/or configured with multiple slopes to facilitate filling of the compartments with sorbent material and/or a process of attaching the first and/or second membranes to the frame. In some embodiments, at least one of the ends of the walls include a triangular profile.

In some embodiments, a stream of air comprising adsorbates enters the frame via the first inlet side and comes in contact with the sorbent material, to which the adsorbates adhere.

In some embodiments, the melting is performed at a temperature ranging from the Glass Transition Temperature (Tg) to the Melting temperature (Tm) of the wall material.

There is thus provided according to an embodiment of the present description a sorbent cartridge manufacturing method comprising providing a frame including a first side, a second side, a plurality of compartments each configured to hold sorbent material, a plurality of respective walls arranged to form and separate the plurality of compartments, wherein a first end of each wall is arranged on the first side and a second end of each wall is arranged on the second side, arranging a first air and/or fluid permeable membrane on the first side, melting at least a portion of the first end of the plurality of the walls, wherein portions of the first permeable membrane lying adjacent the melted portion of the first end are configured to bond with the melted portion thereby affixing the first permeable membrane thereto, filling the plurality of the compartments with sorbent material, arranging a second air and/or fluid permeable membrane on the second side, melting at least a portion of the second end of the plurality of the walls, wherein portions of the second permeable membrane lying adjacent the melted portion of the second end are configured to bond with the melted portion thereby affixing the second permeable membrane thereto.

In some embodiments, melting is facilitated by applying heat, radiation or ultrasonic power. In some embodiments, application of heat comprises applying pressure to the first and/or second ends of the plurality of walls via a plate for a predetermined period of time. In some embodiments, the plate is configured with apertures, at least a portion of which correspond with one and/or another of the plurality of compartments. In some embodiments, filling comprises filling the plurality of the compartments with sorbent material to full capacity from the first membrane to the second membrane.

There is thus provided according to an embodiment of the present description a sorbent cartridge sealing system, the cartridge comprising a frame including a first side, a second side, a plurality of compartments each configured to hold sorbent material, a plurality of respective walls arranged to form and separate the plurality of compartments, wherein a first end of each wall is arranged on the first side and a second end of each wall is arranged on the second side, the cartridge further comprising a first air and/or fluid permeable membrane arranged on the first side and a second air and/or fluid permeable membrane arranged on the second side, the system comprising a platform configured to support the cartridge frame, and at least one plate configured to apply force to the first end and/or the second ends of the plurality of walls such that at least a portion of the first and/or second ends melt and bond with the corresponding portions of the first and/or second membrane lying adjacent thereto to affix the first and/or second membrane to the frame.

In some embodiments, at least one plate is further configured with one or more apertures at least a portion of each align with respective compartments of the frame. In some embodiments, the apertures are configured to vent vapor and/or hot gas emanating from the sorbent material during the affixing process. In some embodiments, the platform is further configured with one or more apertures at least a portion of each align with respective compartments of the frame. In some embodiments, the apertures are configured to vent vapor and/or hot gas emanating from the sorbent material during the affixing process.

These and other embodiments, as well as advantages and objects of the inventive subject matter according to the present disclosure will become even more apparent in view of the figures, briefly described below, and following detailed description (of at least some of the embodiments).

BRIEF DESCRIPTION OF THE DRAWINGS

The skilled artisan will understand that the drawings are primarily for illustrative purposes and are not intended to limit the scope of the inventive subject matter described herein. Furthermore, it is noted that the drawings are not necessarily to scale; for example, in some instances, various aspects of the inventive subject matter disclosed herein may be shown exaggerated or enlarged in the drawings to facilitate an understanding of certain features. Like reference characters among the drawings generally refer to like features (e.g., functionally similar and/or structurally similar elements).

FIGS. 1A and 1B illustrate a cartridge in an exploded (1A) and assembled (1B) arrangement, constructed and operative according to some embodiments;

FIGS. 6A-6F illustrate steps in a manufacturing process for making the cartridge, operative according to some embodiments; and FIGS. 7A and 7B illustrate a vertically positioned cartridge (7A) and a single compartment (7B), constructed and operative according to some embodiments.

DETAILED DESCRIPTION OF SOME OF THE EMBODIMENTS

Figure 2B:
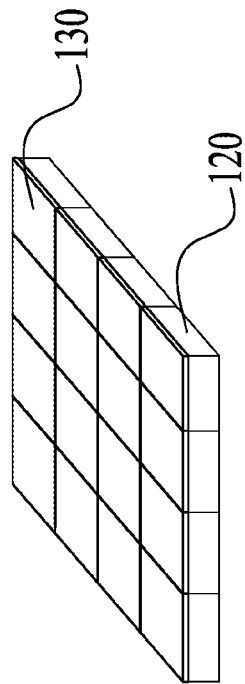
FIGS. 2A-2D illustrate steps in manufacturing a sorbent cartridge, constructed and operative according to some embodiments.

In the following description, various aspects of the present invention will be described with reference to a multitude of embodiments. For purposes of explanation, specific configurations and details are set forth in order to provide a thorough understanding of the inventive subject matter presented by the current disclosure. However, it will also be apparent to one skilled in the art that the some of the inventive subject matter presented in this disclosure may be practiced without the specific details presented herein. Furthermore, well-known features may be omitted or simplified in order not to obscure inventive subject matter in the present disclosure.

Accordingly, in some embodiments of the present disclosure, an airflow scrubbing system is disclosed which can comprise a scrubber system that contains a sorbent (the sorbent may be provided in a cartridge format), which is configured to remove from an airflow unwanted contaminants and gases, including, for example, acidic gases, carbon monoxide, carbon dioxide, sulfur oxide, nitrous oxide, radon, particles, inorganic compounds, organic vapors, and micro-organisms (such as but not limited to bacteria, viruses, mold, fungi)—all of the foregoing collectively referred to as "adsorbates". The system is configured such that the airflow flows through the cartridge where the air comes in contact with the sorbent material, to which the adsorbates adhere, and thus removed at least partially from the air stream. Further examples of air scrubbers and cartridges are disclosed in PCT Publication, titled "Regenerable sorbent cartridge assemblies in air scrubbers", PCT/US2015/015690 filed Feb. 12, 2015, the entire contents of which is incorporated by reference herein in its entirety. Moreover, a scrubbing system may comprise a plurality of cartridges arranged therebetween in any suitable manner, with cartridges may be staggeringly arranged therebetween. This staggered arrangement allows substantially parallel air flow paths of the air to flow therethrough. Exemplary cartridges and arrangement modules are disclosed in applicant's US Patent Publication No. 20110198055, which is incorporated herein by reference in its entirety.

In some embodiments, the airflow scrubbing system may be configured to switch to a regeneration mode so that the accumulated adsorbates can be removed from the sorbent via a purge gas stream and/or heat (e.g., via a concentration and/or temperature swing cycle). In a temperature swing configuration, a heat source (e.g., heater) may heat the sorbent and/or the purge gas.

With reference to FIGS. 1A-B, in some embodiments, a sorbent cartridge 110 including a sorbent material 114 is shown in both exploded and assembled arrangements. FIG. 1A shows components of the cartridge 110 (shown assembled in FIG. 1B) configured for inclusion in an air scrubbing system. The cartridge 110 may comprise a frame 120 configured with a plurality of compartments 118 in a grid arrangement (e.g. a honeycomb configuration, a lattice of squares/rectangles/triangles or any geometric shape etc.) which, in some embodiments, help maintain the desirable distribution of a granular sorbent (the terms "grid" and "frame" are used interchangeably). The compartments are configured to hold or otherwise contain the sorbent material 114 (e.g., solid sorbent material). The compartments can be formed by walls/cross-bars 121 (see also, ref no. 172, FIG. 5B). The sorbent 114 may come in different shapes and sizes, for example, a granular, solid material and/or a monolith (or several large "chunks" of adsorbent), which may be configured to fill portions of a plurality of compartments 118 within the cartridge 110. Each compartment is preferable filled, or nearly-filled (i.e., substantially filled), though in some embodiments, a portion of each of compartment (or several or more—or all—of the plurality of compartments).

An exemplary sorbent material may comprise a granular solid support material supporting an amine-based compound, such as disclosed in applicant's PCT application PCT/US12/38343, which is incorporated herein by reference in its entirety. Other sorbent materials or further solid support materials may include, but are not limited to, gels, molecular sieves, nanotube-containing materials, porous materials, sponge and sponge-like materials, electro-magnetically charged objects, porous organic polymers, ion exchange resins, polymeric absorbent resins, acrylic ester polymers, polystyrene divinyl benzene, polymethyl methacrylate (PMMA), polystyrene, styrene divinylbenzene (SDB), fly ash, natural or synthetic porous carbon, activated carbon, carbon nanotubes, alumina nanoparticles, zeolite, synthetic zeolite, alumina, porous alumina, porous minerals, silica, porous silica, silica nanoparticle, fumed silica, activated charcoal, aluminum phyllosilicates, bentonite, montmorillonite, ball clay, fuller's earth, kaolinite, attapulgite, hectorite, palygorskite, saponite, sepiolitemetal, organic frameworks, metal organic frameworks, molecular sieves, and one or more combinations thereof. In some embodiments, the amines, may comprise amine-polymers, including linear and/or branched triethylenetetramine (TETA), tetraethylenepentamine (TEPA), pentaethylenehexaamine (PEHA); triethylamine (TEA), monoethanolamine (MEA), ethanolamine, methylamine, polyethyleneimine (PEI), diethanolamine (DEA), dimethylamine, diethylamine, diisopropanolamine (DIPA), methyldiethanolamine (MDEA), methylethanolamine, polyethilenamine, and combinations thereof. In an non-limiting example, the surface area of the granules can vary from about 4 mesh to about 140 mesh, from about 4 mesh to about 100 mesh, from about 5 mesh to about 80 mesh, from about 5 mesh to about 60 mesh, from about 5 mesh to about 40 mesh, from about 4 mesh to about 20 mesh, less than about 20 mesh, less than about 40 mesh, including values and subranges therebetween.

In some embodiments, the grid 120 may be confined by at least one air/fluid-permeable screen 122 covering opposed sides of the frame (see e.g., screen 130 and screen 140 of FIG. 1B). A screen may also be referred to as a membrane— so long as the referred to structure (membrane or screen) includes an air and/or fluid permeable functionality. Accordingly, such screens 122 may comprise any structure which is permeable to air and/or a fluid and thus having relatively low flow resistance. For example, screen 122 may be made from or reinforced by a permeable filter material such as, but not limited to a fiber sheet (e.g., natural fiber, synthetic filter, woven fiber etc.), polymer sheet, polytetrafluoroethylene (PTFE) sheet, perforated sheet, wood-based materials, cellulose fibers, paper cardboard, meshed/perforated structure (e.g., metal and/or plastic based sieve with holes and/or meshes to allow for the flow of air), and/or the like. The frame is configured such that the adsorbates (via an airflow) flow through the cartridge 110 via an inlet side (covered by a first permeable screen), and exit from an outlet side (covered by a second permeable screen).

The grid 120 (and hence the walls 121/172) can be made from materials such as polymer, plastic, (e.g. polypropylene), metal, composite material, wood-based materials, cellulose fibers, paper, cardboard and/or other natural or synthetic fiber based sheet materials. A plastic grid 120 can be produced by plastic injection molding techniques or any other suitable method (e.g., 3D printing). In some embodiments, the entire grid 120 can be a single monolithic piece made by such techniques.

In some embodiments, one and/or another of the screens 122/130/140 may be secured proximate (and in some embodiments immediately over) to the grid 120 so as to enclose the sorbent 114 placed in the compartments 118. For example, in some embodiments, a screen is adhered to the grid by melting at least a portion of the grid material such that it adheres to or otherwise bonds to the material of the screen. For example, the melted frame material may seep into the pores of the screen 122 at an adjoining area. As shown, an adjoining area may be at the surface of cross bars 121/172 namely, the ends thereof (see, e.g., FIG. 6F which schematically illustrates portions of the grid 120 melted into the pores of screen 130 and screen 140). Grid melting may be performed by thermoplastic welding or any other suitable process, including, for example, applied pressure. Accordingly, in such embodiments, a screen may be secured to the grid without any additional adhesive or fasteners. The membranes 122 can be attached permanently to the walls in this way. In some embodiments, a first side of the grid is bonded to a first screen, the compartments 118 then filled with sorbent 114, and then a second opposed side of the grid can be bonded to a second screen. While the current cartridge is shown in a square/rectangular arrangement, such that the inlet and outlet sides are opposed, other embodiments of the cartridge can be tube-like—such that the outer diameter is the first side, and the second side is opposed, but comprises the inner diameter, with the grid in between. In still other embodiments, the grid may be configured such that the inlet side and outlet sides are orthogonal to one another.

In some embodiments, the ends of walls 121/172 may melt and bond to the screen at its pores, with additional melting of the screen which aids in the bonding. In some embodiments, the ends of walls 172 may melt and bond to the membrane 122 while the membrane 122 does not melt. In some embodiments, the membrane material may melt and bond to the ends of the walls, while the wall material does not melt. Accordingly, such manufacturing enable the containment of the sorbent 114 and provide a sufficiently strong cartridge 110 for use in an airflow scrubbing system without requiring additional covers or metal supports (according to some embodiments; some embodiments may include other additional support components).

As noted above, the melting of wall material and/or screen membrane material may be performed in any suitable manner using any form of energy, such as, for example, the application of heat and/or pressure, as will be described in reference to FIGS. 2A-2D, or by radiation or ultrasonic power, for example.

Figure 2A:
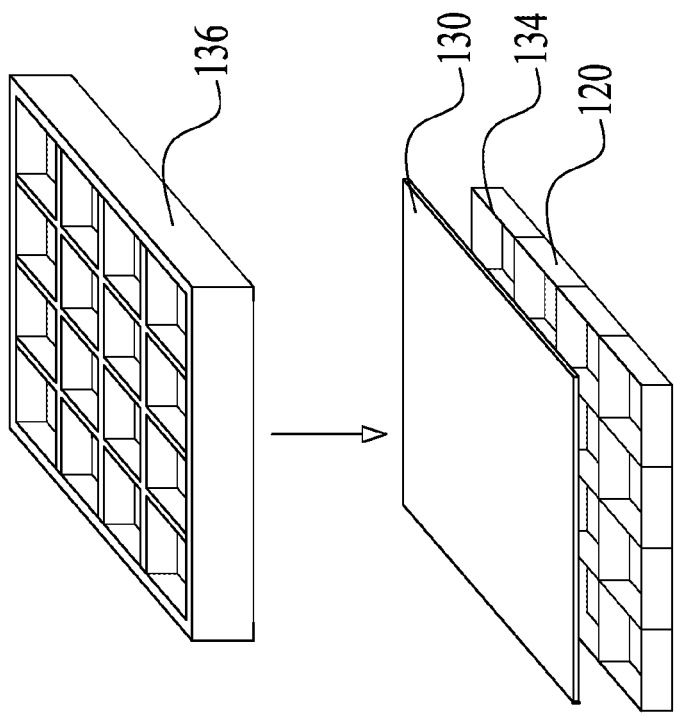

An exemplary thermoplastic welding process is shown in FIGS. 2A-2D. The welding process is performed by a sorbent cartridge sealing system comprising a heated hot press(es), plate(s) or platen(s) 136 and a platform(s) (e.g. table 158 of FIG. 4) configured to support the cartridge frame placed thereon. Initially, as shown in FIG. 2A, screen 130 and grid 120 are heated at an adjoining area 134 within the system. The screen 130 is placed on the grid 120, and a heated platen 136, which may comprise a lattice corresponding to the grid 120, is pressed against the grip by the application of force/pressure upon the screen 130 to the grid. Correspondingly, grid 120, at adjoining area 134, is melted into the pores of screen 130 and is thereby secured thereto (see FIG. 2B).

In some embodiments, additional plates, such as plate 138 (FIG. 3), may be provided for added strength to platen 136. Platen 136 can be constructed for welding a relatively large grid, such as a 60×60 cm grid, or up to a 200×200 cm grid (for example) including values and subranges therebetween or more, while typically plate welding is performed on much smaller surfaces, such as 15×15 cm or less.

Screen 130 and grid 120, now rotated, may form a base to receive the sorbent 114 within the compartments 118. In FIG. 2C a single compartment is shown filled with the sorbent 114, and a plurality or all of the compartments 118 may be filled with the sorbent 114. At times, while filling the compartments 118 with the sorbent 114, some sorbent granules may settle on grid surface 146 (namely, an end of walls 172). In some embodiments grid surface 146 may be formed with a slanted surface to facilitate the descent of the settled sorbent granules off grid surface 146, as will be further described in reference to FIGS. 5A-6F.

Figure 2D:
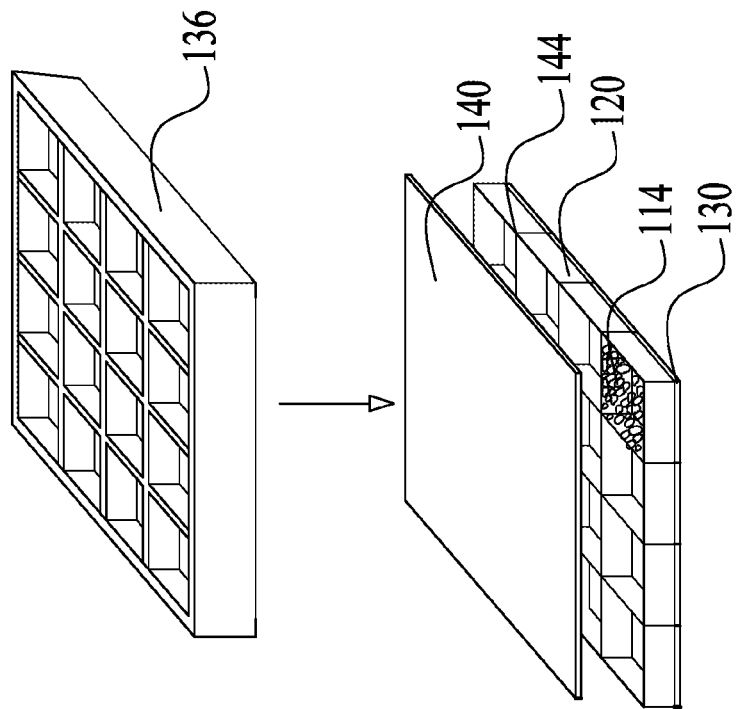
Figure 2C:
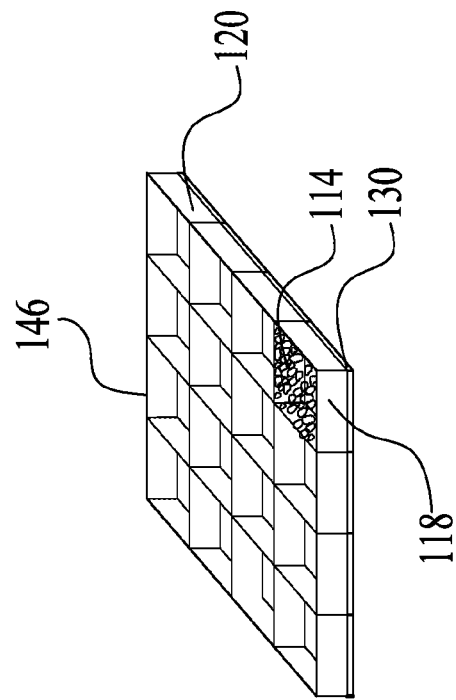

To enclose the cartridge 110, screen 140 can be placed on the grid 120 over the sorbent 114, as shown in FIG. 2D. The heated platen 136 can then be pressed upon the assembly of the screen 140 and grid—i.e., the ends of the walls adjacent screen 140 (i.e., adjoining area 144). Accordingly, grid 120, at an adjoining area 144 (grid's surface 146), is melted and the melted material bonds to or otherwise affixes/adheres to the pores of screen 140 and is thereby secured thereto. The assembled cartridge 110 is shown in FIG. 1B.

In some embodiments the heating comprises applying pressure to the first and/or second ends of the plurality of walls 172 via the platen 136 for a predetermined period of time. The welding duration may be between about 1 to 3 minutes on each side, about 0.5 to 5 minutes or about 1 to 2 minutes or about 2 to 3 minutes, for example.

The platen 136 may be heated to any suitable temperature for melting the adjoining areas 134 and 144 of the grid 120 with the respective screens 130 and 140. In some embodiments, the platen temperature T may range from the Glass Transition Temperature (Tg) to the Melting temperature (Tm) of the grid material, such that $$Tg \leq T \leq Tm$$

Thereby, the grid material may be melted at the adjoining areas 134 and 144 without changing the properties of the grid 120 and without singeing the screen 130. In some embodiments, selecting a platen temperature T closer to the Tg may be advantageous to maintain the properties of the grid 120. Yet a temperature requires a longer welding process. Accordingly, selection of the welding temperature T and the duration of the welding process entails finding the optimal balance between the selected temperature and duration. In some embodiments, the platen temperature T is the heating temperature during welding, also referred to herein as the "welding temperature". In a non-limiting example, for a polypropylene grid, the welding temperature is in the range of about 110-130 C°, commensurate with the polypropylene properties wherein Tg=−10 C.° and Tm=173 C°.

The material of the sorbent 114 may comprise a relatively high level of humidity, such as within a range of about 5%-30% or more (e.g. up to 20%) of the sorbent material total volume. Since thermoplastic welding within a humid environment can be challenging as condensed liquid can interfere with the melting of the grid 120 at the adjoining area 144 and weaken the adherence of screen 140 to grid 120, conditions during welding screen 140 to the grid 120 can be adjusted (to the humid environment) and are thus different than the welding conditions of screen 130 to grid 120. For example, the platen 136 may be heated to a higher temperature and/or may be applied for a longer duration during welding the grid 120 to the screen 140, than during welding the grid 120 to the screen 130. In a non-limiting example, for a polypropylene grid, heating of the grid 120 during welding to screen 140 may be performed at a welding temperature about 10 to 20 C° greater and/or for 1 to 2 minutes longer than during welding grid 120 to screen 130.

Figure 3:
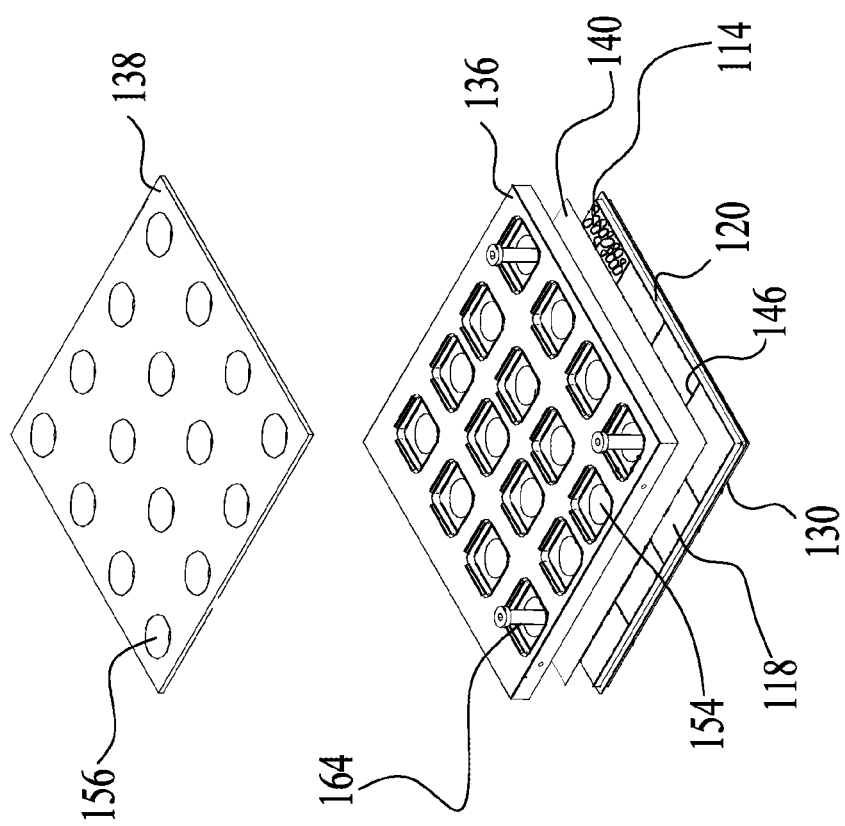
FIG. 3 illustrates a cartridge manufacturing system, constructed and operative according to some embodiments.
Figure 4:
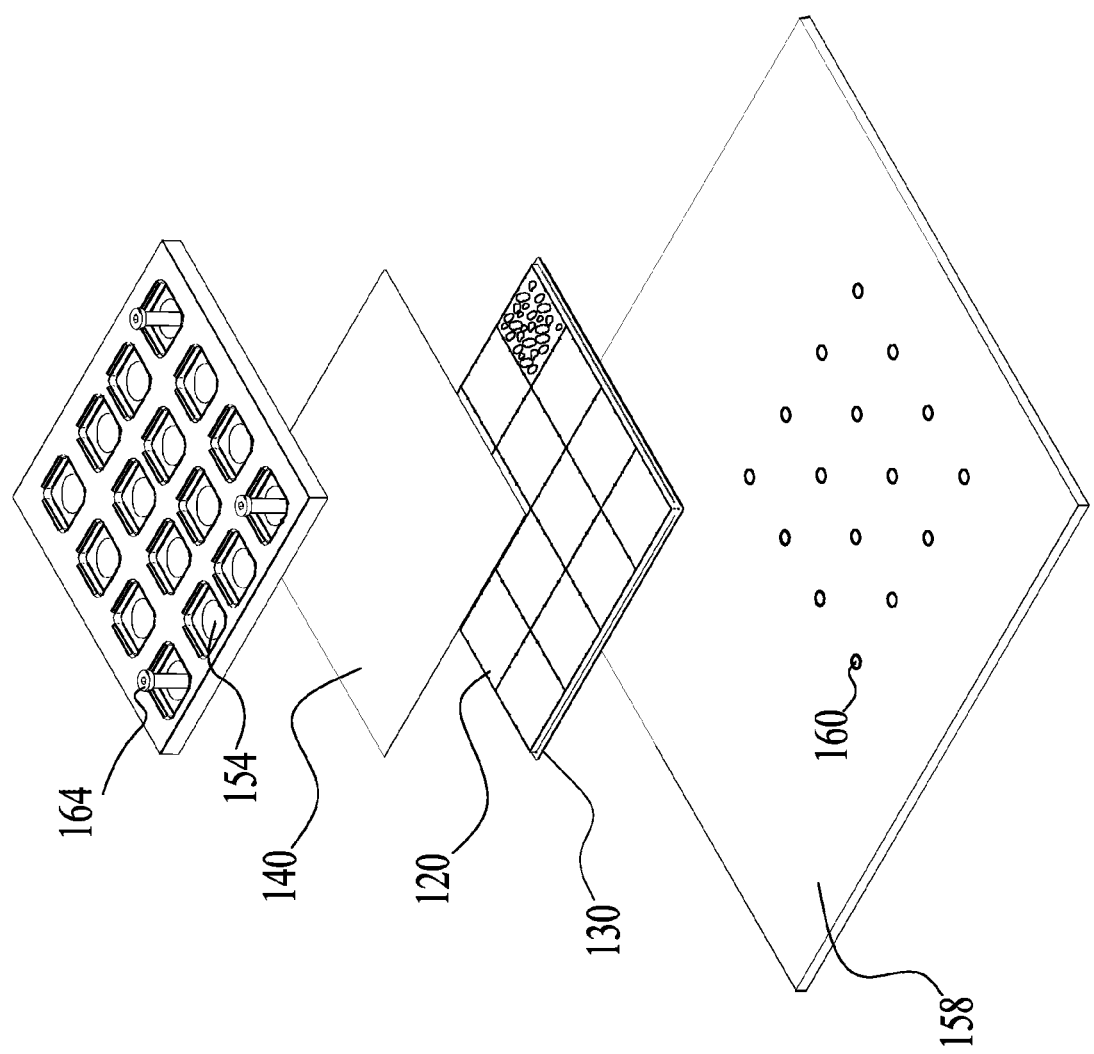
FIG. 4 illustrates a cartridge manufacturing system, constructed and operative according to some embodiments.

Further solutions for overcoming the humid sorbent environment may include releasing the sorbent humidity from the cartridge 110. As seen in FIGS. 3 and 4, in some embodiments, the sorbent humidity may be released to the ambient via apertures 154 formed in the platen 136, wherein the apertures 154 operate as conduits for release of the sorbent humid vapors or hot gases therefrom. Apertures 154 may be formed to align with the grid compartments 118 to facilitate the vapor release from the sorbent 114 or may be formed at any suitable location on the platen 136. The additional plate 138 is formed with corresponding apertures 156, as well, to allow release of humidity therefrom.

Releasing the sorbent humidity via the apertures 154 (and 156 if applicable) can, in some embodiments, shorten the duration for welding grid surface 146 to screen 140. In a non-limiting example, release of humidity via apertures 154 shortens the duration for welding grid surface 146 to the screen 140 by about 15 seconds or more or by about 15-30 seconds or by about 15-60 seconds. The welding process may be performed as described in reference to FIGS. 2A-2D. FIG. 3 corresponds to FIG. 2D showing the welding of screen 140 to the sorbent filled grid 120 following welding of the bottom screen 130 to the grid 120.

As seen in FIG. 4, in some embodiments, a platform or table 158 of the plate welding system may be formed with humidity releasing apertures 160 allowing the humidity to be released via the screen 130 and apertures 160 into the ambient. In such an embodiment, the platen 136 may be formed with or without apertures 154. In FIG. 4 the platen 136 comprises apertures 154.

In an embodiment, the heated platen 136 (and any other additional plate 138) may thermally expand during welding, and thus deform, compromising the uniform contact of the screens 130 or 140 to the grid 120. This is addressed in some embodiments, via floating screws 164 (FIGS. 3 and 4) which may be used to initially loosely attach the platen 136 and additional plate 138, prior to welding. Following heating, and possibly leveling the platen 136 to be in contact with the screen 130 or 140 and the grid 120, the screws are securely fixed.

As described with reference to FIG. 2C, sorbent granules may inadvertently settle on the surface 146, and interfere with the bonding of screens (e.g., screen 140) to grid 120. Accordingly, in some embodiments, the grid surface 146 may be formed with a slanted surface to facilitate the descent of sorbent granules into the compartments 118. FIGS. 5A-6F show the slanted surface comprising a triangular-like surface 170 forming an angled profile. In some embodiments the sloped surface may comprise any downwardly extending surface, such as a convex-like surface, a curved surface, or a rounded surface, for example. The triangular-like surface 170 may comprise any triangular-like profile or form, such as a right angle triangle, an equilateral triangle, an isosceles triangle, a scalene triangle, an acute triangle and/or an obtuse triangle, for example. In some embodiments, grid surface 146 may be beveled, sloped, and/or configured with multiple slopes to facilitate filling of the compartments 118 with sorbent material 114 and/or a process of attaching the first and/or second membranes 112 to the frame 120.

Furthermore, according to such embodiments, the triangular surface 170 allows filling the compartments 118 up to (for example) the apex 174 of the triangular surface 170. During welding, the triangular surface 170 melts into screen 140 and an additional portion 180 of underlying wall 172 (forming the adjoining area 144). The sorbent 114 is therefore packed in the compartment 118, thus minimizing formulation of the undesired air gaps within the cartridge 110 (e.g., through the settling of sorbent material). Incoming untreated air is now forced to flow via the sorbent for treatment thereof.

Figure 5B:
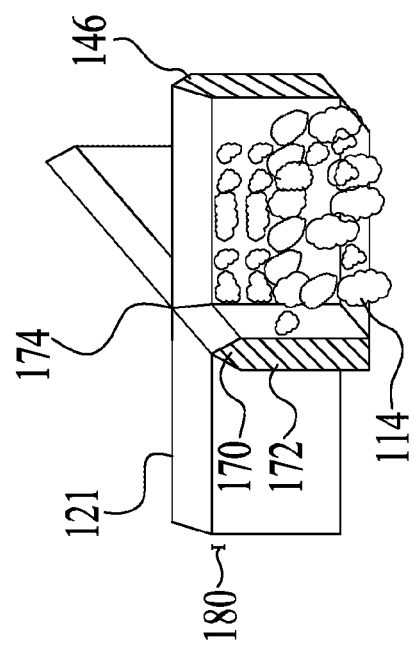
FIGS. 5A-5C illustrate a cartridge in an exploded arrangement (FIG. 5A), a cross sectional illustration along lines VB-VB in FIG. 5A (FIG. 5B), and an assembled arrangement (FIG. 5C), constructed and operative according to some embodiments.
Figure 5C:
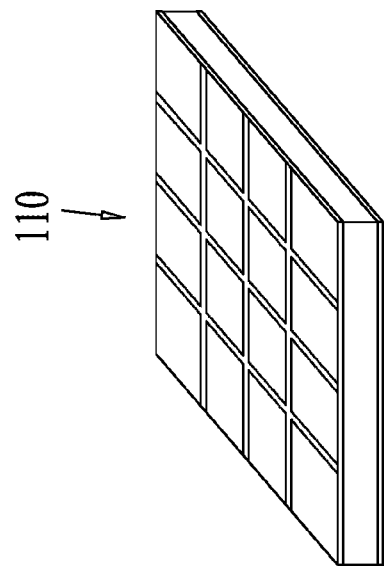
Figure 5A:
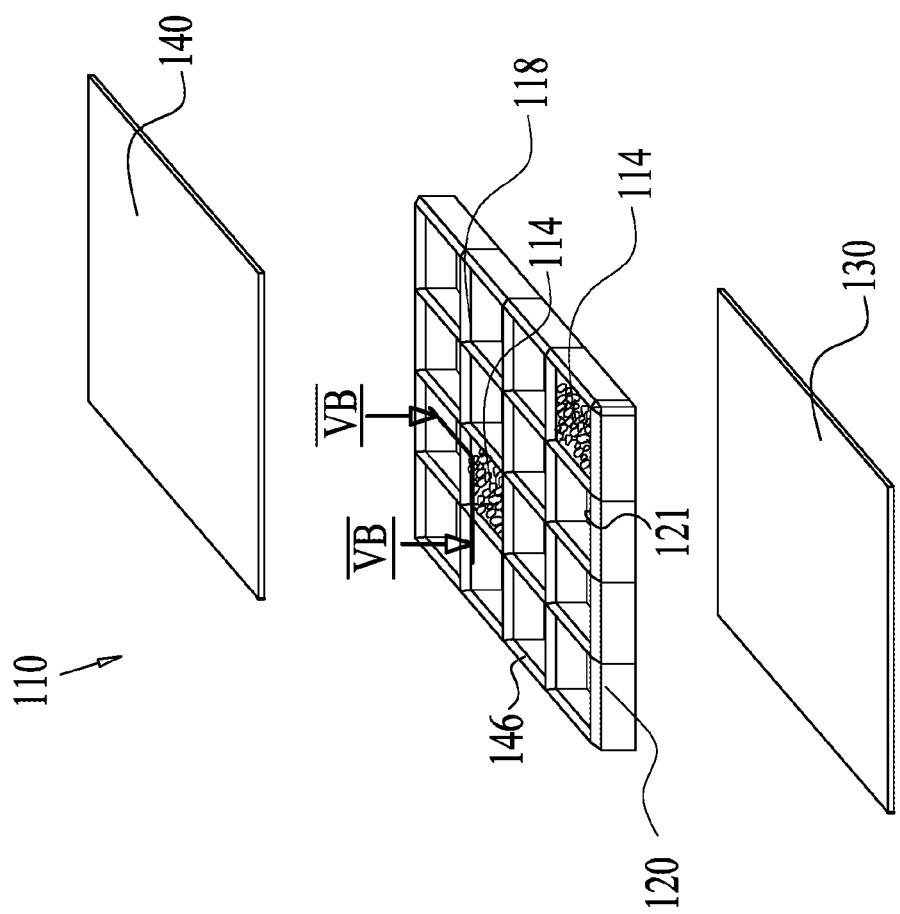

As seen in FIG. 5B, (shown enlarged) surface 146 of both the horizontal and vertical cross bars 121 are triangularly shaped. In some embodiments, only the horizontal or vertical cross bars or a portion thereof may be formed with the triangular surface 170. The height of the triangular surface 170 may be any suitable height. In a non-limiting example, the height of the triangular surface 170 may be in the range of about 1 to 5 mm while the total height of the grid wall 172 (including the triangular surface 170) may be in the range of about 10 to 50 mm.

Figure 6A:
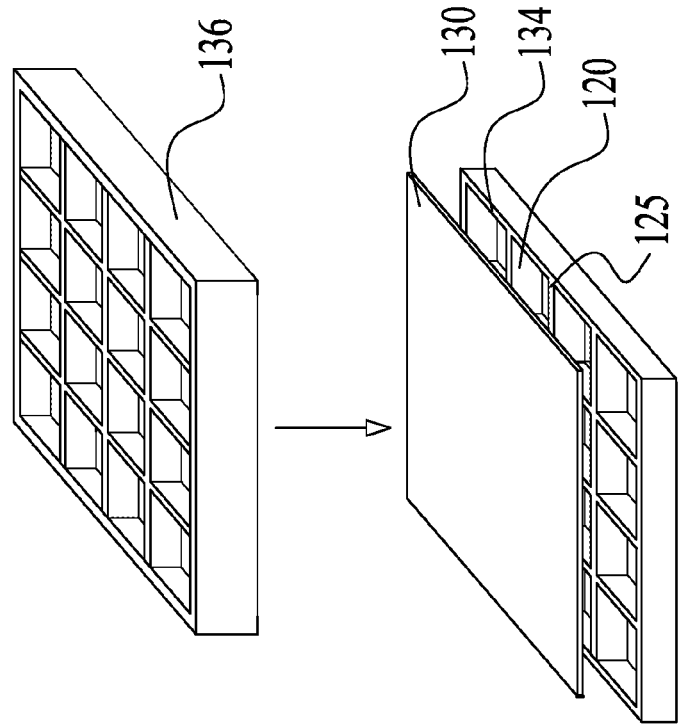
Figure 6B:
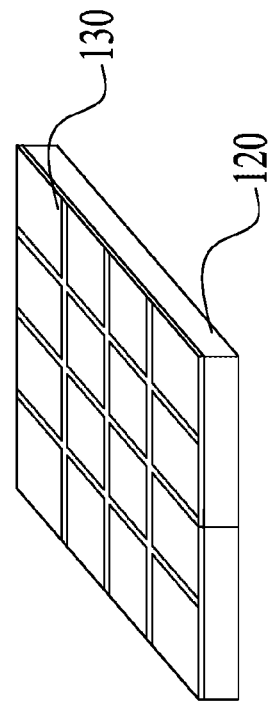

An exemplary thermoplastic welding process for the triangular surface is shown in FIGS. 6A-6F. As shown in FIG. 6A (and similar to FIG. 2A), screen 130 and/or the grid 120, are assembled at the adjoining area 134 within the platen welding system. Screen 130 is placed on the grid 120, whereby heated platen 136 presses upon screen 130. Grid 120 at the adjoining area 134 is melted into the pores of screen 130 (and/or otherwise bonded thereto) thereby securing screen 130 to the grid (as shown in FIG. 6B). Screen 130 and grid 120 are rotated and form a base to receive the sorbent 114 within the compartments 118. As described, triangular surface 170 of the grid is configured to address (and in some embodiments, prevent) settling of sorbent granules on grid surface 146. The compartments 118 may generally be filled with the sorbent 114 to full capacity, such as up to apex 174 (FIG. 5B). FIG. 6C illustrates some compartments are shown filled with the sorbent 114, yet a plurality or all of the compartments 118 may be filled with the sorbent 114.

To enclose the cartridge 110, screen 140 is placed on the grid 120 over the sorbent 114, as shown in FIG. 6D. The heated platen 136 presses upon screen 140. The grid 120 at the adjoining area 144, which comprises the triangular surface 170 and the additional portion 180 of underlying wall 172, is melted into the pores of screen 140 and is thereby secured to screen 140. The assembled cartridge 110 is shown in FIG. 6E.

Figure 6E:
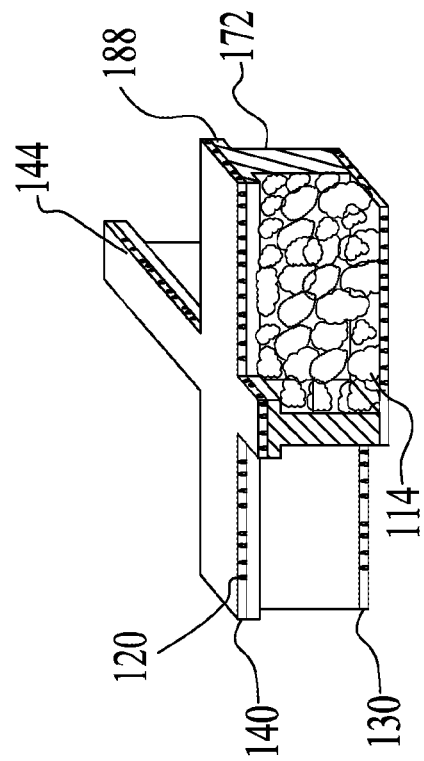
Figure 6F:
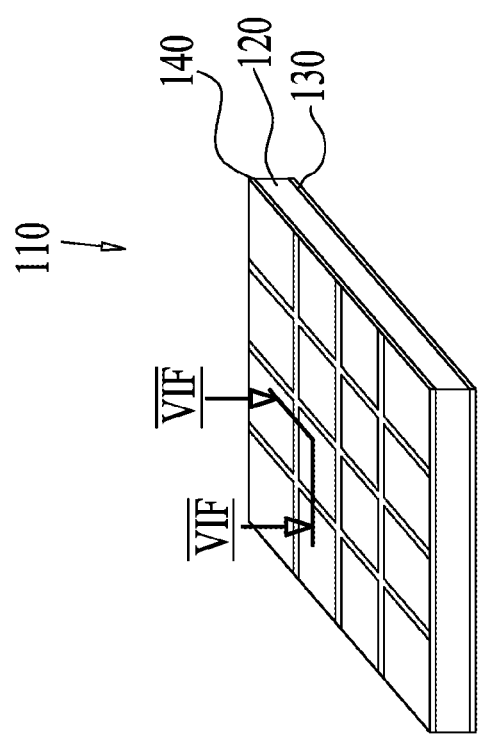

FIG. 6F is a cross sectional illustration along lines VIF-VIF in FIG. 6E. In some embodiments, melting adjoining area 144 forms a ridge 188, which is wider than walls 172. In embodiments, whereupon the cartridge 110 is vertically positioned relative to the ground, the ridge 188 may operate as a flow barrier to obstruct the air flow through the gap 200 and force the air to flow through the sorbent 114.

FIGS. 7A and 7B show another proposed solution to address the airflow from flowing via the gap 200 in vertically positioned cartridges 110 (see, e.g., FIG. 7B, illustrating gap 200 formed in a single compartment 118 of a vertically positioned cartridge 110 without airflow barriers. As shown in FIG. 7A, an airflow barrier may be formed by constructing a wall 204 of a compartment 118 at in incline in respect to the airflow orientation 206. The inclined wall 204 obstructs the air flow path through gap 200 and forces the air to flow through the sorbent 114. The surface 204 may be inclined to any suitable degree, such as from 1 to 50 degrees, for example. Any one or more of the surfaces of the compartments 118 can be inclined to prevent formation of an air gap. For example, both wall 204 and a parallel, wall 214 may be inclined, forming a single compartment 118 as a parallelepiped. In some embodiments, all four compartment walls (also referred to as walls 172 in FIG. 5B) may be inclined, wall 204 and parallel, bottom wall 214, as well as two parallel lateral walls 216.

In some embodiments, the cartridge 110 may be formed with a peripheral frame 220. The frame 220 is formed with an uninclined, rectangular contour. A resultant air gap 200 may form intermediate the sorbent 114 and a surface 224 of the frame 220. The surface 224 may be formed with a rim 230 extending over grid surface 204 operating as a flow barrier for obstructing the airflow through gap 200 and forcing the air to flow through the sorbent 114.

Further example of airflow barriers are disclosed in PCT Publication, PCT/US2015/015690 and U.S. Provisional Patent Application No. 62/046,174, titled "Vertical Enclosure Assemblies in Airflow Systems," filed Sep. 5, 2014, the entire contents of which is incorporated by reference herein in its entirety.

It is noted that the cartridge 110 is described as housing a sorbent for removal of adsorbates in an airflow scrubbing system. It is appreciated that any one of the features/functionality described herein (e.g., apertures of FIGS. 3 and 4, triangular surface of FIGS. 5A-6F, inclined walls of FIGS. 7A and 7B) can be formed in a cartridge utilized in other systems. Likewise, the cartridge manufactured according to the welding process of FIGS. 2A-2D may be utilized in other systems (e.g., non-scrubber bases systems). Non-limiting examples of such systems may include fluids flowing through cartridges or cells containing powders or any other particles; systems comprising powder or particle-containing cartridges or cells benefiting from maximal packing of the powder or particles; systems benefiting from humidity reduction or likewise pressure reduction within its cartridge; or systems comprising cartridges containing materials with relatively low boiling temperatures.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be an example and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure. Some embodiments may be distinguishable from the prior art for specifically lacking one or more features/elements/functionality (i.e., claims directed to such embodiments may include negative limitations).

In addition, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Any and all references to publications or other documents, including but not limited to, patents, patent applications, articles, webpages, books, etc., presented anywhere in the present application, are herein incorporated by reference in their entirety. Moreover, all definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "compose d of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A sorbent cartridge retention frame configured for use in an air scrubbing system comprising:
    a first inlet side;
    a second outlet side;
    a plurality of compartments each configured to hold a solid-sorbent material;
    a plurality of respective walls arranged to form and separate the plurality of compartments;
    a first permeable membrane arranged to cover the first inlet side;
    a second permeable membrane arranged to cover the second outlet side;
    wherein:
        the first and/or second permeable membrane are configured for affixation to respective ends of the walls through a process of melting and solidification of the wall and/or membrane material such that the membrane and wall bond together, and
        at least one of the ends of the walls is beveled, sloped, and/or configured with multiple slopes to facilitate filling of the compartments with sorbent material and/or a process of attaching the first and/or second membranes to the frame.

2. The frame of claim 1, wherein at least one of the ends of the walls include a triangular profile.

3. The frame of claim 1, wherein a stream of air comprising adsorbates enters the frame via the first inlet side and comes in contact with the sorbent material, to which the adsorbates adhere.

4. A sorbent cartridge manufacturing method comprising:
    providing a frame comprising a first side, a second side, a plurality of compartments each configured to hold sorbent material, a plurality of respective walls arranged to form and separate the plurality of compartments, wherein a first end of each wall is arranged on the first side and a second end of each wall is arranged on the second side;
    arranging a first air and/or fluid permeable membrane on the first side,
    melting at least a portion of the first end of the plurality of the walls, wherein portions of the first permeable membrane lying adjacent the melted portion of the first end bond with the melted portion thereby affixing the first permeable membrane thereto;
    filling the plurality of the compartments with sorbent material;
    arranging a second air and/or fluid permeable membrane on the second side, and
    melting at least a portion of the second end of the plurality of the walls, wherein portions of the second permeable membrane lying adjacent the melted portion of the second end are configured to bond with the melted portion thereby affixing the second permeable membrane thereto,
    wherein one or more edges of the second end of the plurality of walls are beveled, sloped, multiply sloped, and/or triangular in profile.

5. The method of claim 4, wherein melting is facilitated by applying heat, radiation or ultrasonic power.

6. The method of claim 5, wherein application of heat comprises applying pressure to the first and/or second ends of the plurality of walls via a plate for a predetermined period of time.

7. The method of claim 4, wherein said filling comprises filling the plurality of the compartments with sorbent material to full capacity from the first membrane to the second membrane.

8. The method of claim 4, wherein the melting is performed at a temperature ranging from the Glass Transition Temperature (Tg) to the Melting temperature (Tm) of the wall material.

9. A sorbent cartridge manufacturing method comprising:
    providing a frame comprising a first side, a second side, a plurality of compartments each configured to hold sorbent material, a plurality of respective walls arranged to form and separate the plurality of compartments, wherein a first end of each wall is arranged on the first side and a second end of each wall is arranged on the second side;

arranging a first air and/or fluid permeable membrane on the first side, melting at least a portion of the first end of the plurality of the walls, wherein portions of the first permeable membrane lying adjacent the melted portion of the first end bond with the melted portion thereby affixing the first permeable membrane thereto;

filling the plurality of the compartments with sorbent material;

arranging a second air and/or fluid permeable membrane on the second side, and melting at least a portion of the second end of the plurality of the walls, wherein portions of the second permeable membrane lying adjacent the melted portion of the second end are configured to bond with the melted portion thereby affixing the second permeable membrane thereto, wherein
melting is facilitated by applying heat, radiation or ultrasonic power, application of heat comprises applying pressure to the first and/or second ends of the plurality of walls via a plate for a predetermined period of time, and the plate is configured with apertures, at least a portion of which correspond with the one and/or another of the plurality of compartments.

10. A sorbent cartridge sealing system, the cartridge comprising a frame including a first side, a second side, a plurality of compartments each configured to hold sorbent material, a plurality of respective walls arranged to form and separate the plurality of compartments, wherein a first end of each wall is arranged on the first side and a second end of each wall is arranged on the second side, the cartridge further comprising a first air and/or fluid permeable membrane arranged on the first side and a second air and/or fluid permeable membrane arranged on the second side, the system comprising:

a platform configured to support the cartridge frame, and at least one plate configured to apply force to the first end and/or the second ends of the plurality of walls such that at least a portion of the first and/or second ends melt and bond with the corresponding portions of the first and/or second membrane lying adjacent thereto to affix the first and/or second membrane to the frame, wherein the at least one plate is further configured with one or more apertures at least a portion of each align with respective compartments of the frame.

11. The system of claim 10, wherein the apertures are configured to vent vapor and/or hot gas emanating from the sorbent material during the affixing process.

12. A sorbent cartridge sealing system, the cartridge comprising a frame including a first side, a second side, a plurality of compartments each configured to hold sorbent material, a plurality of respective walls arranged to form and separate the plurality of compartments, wherein a first end of each wall is arranged on the first side and a second end of each wall is arranged on the second side, the cartridge further comprising a first air and/or fluid permeable membrane arranged on the first side and a second air and/or fluid permeable membrane arranged on the second side, the system comprising:

a platform configured to support the cartridge frame, and at least one plate configured to apply force to the first end and/or the second ends of the plurality of walls such that at least a portion of the first and/or second ends melt and bond with the corresponding portions of the first and/or second membrane lying adjacent thereto to affix the first and/or second membrane to the frame, wherein the platform is further configured with one or more apertures at least a portion of each align with respective compartments of the frame.

13. The system of claim 12, wherein the apertures are configured to vent vapor and/or hot gas emanating from the sorbent material during the affixing process.

* * * * *